US008189781B1

(12) United States Patent
Hartman

(10) Patent No.: US 8,189,781 B1
(45) Date of Patent: May 29, 2012

(54) PROTECTION OF DIGITAL IMAGES

(76) Inventor: Matthew Forrest Hartman, Potomac, MD (US)

( * ) Notice: Subject to any disclaimer, the term of this patent is extended or adjusted under 35 U.S.C. 154(b) by 248 days.

(21) Appl. No.: 12/499,445

(22) Filed: Jul. 8, 2009

Related U.S. Application Data

(60) Provisional application No. 61/079,146, filed on Jul. 9, 2008.

(51) Int. Cl.
*H04L 29/06* (2006.01)
(52) U.S. Cl. .......................... 380/210; 382/254; 382/286
(58) Field of Classification Search .................. 380/216, 380/243, 251, 210; 382/232, 254, 276, 286
See application file for complete search history.

(56) References Cited

U.S. PATENT DOCUMENTS

| 2006/0013435 A1* | 1/2006 | Rhoads | 382/100 |
| 2007/0243919 A1* | 10/2007 | Thelen et al. | 463/9 |
| 2009/0088235 A1* | 4/2009 | Stein, III | 463/9 |

* cited by examiner

*Primary Examiner* — Hadi Armouche

(57) ABSTRACT

A method includes obtaining an original image; dividing the original image into a plurality of pixel blocks; forming a scrambled image by rearranging the plurality of pixel blocks; and forming a markup language description to display the original image from the scrambled image. Each pixel block may represent a rectangular region of the original image. The markup language description may be an HTML description.

20 Claims, 10 Drawing Sheets

Fig. 5

| #Chunks | Size of decryption file (in bytes) | Source Image Size (in kilobytes) | | | | | | | | | |
|---|---|---|---|---|---|---|---|---|---|---|---|
| | | 15 | 50 | 100 | 200 | 300 | 450 | 600 | 850 | 1000 | 2000 | 3000 |
| 1 | 1821 | 12% | 4% | 2% | 1% | 1% | 0% | 0% | 0% | 0% | 0% | 0% |
| 10 | 2765 | 18% | 6% | 3% | 1% | 1% | 1% | 0% | 0% | 0% | 0% | 0% |
| 20 | 3813 | 25% | 8% | 4% | 2% | 1% | 1% | 1% | 0% | 0% | 0% | 0% |
| 30 | 4862 | 32% | 10% | 5% | 2% | 2% | 1% | 1% | 1% | 0% | 0% | 0% |
| 40 | 5910 | 39% | 12% | 6% | 3% | 2% | 1% | 1% | 1% | 1% | 0% | 0% |
| 50 | 6959 | 46% | 14% | 7% | 3% | 2% | 2% | 1% | 1% | 1% | 0% | 0% |
| 60 | 8007 | 53% | 16% | 8% | 4% | 3% | 2% | 1% | 1% | 1% | 0% | 0% |
| 70 | 8984 | 60% | 18% | 9% | 4% | 3% | 2% | 1% | 1% | 1% | 0% | 0% |
| 80 | 10023 | 67% | 20% | 10% | 5% | 3% | 2% | 2% | 1% | 1% | 1% | 0% |
| 90 | 11061 | 74% | 22% | 11% | 6% | 4% | 2% | 2% | 1% | 1% | 1% | 0% |
| 100 | 12102 | 81% | 24% | 12% | 6% | 4% | 3% | 2% | 1% | 1% | 1% | 1% |
| 160 | 18331 | 122% | 37% | 18% | 9% | 6% | 4% | 3% | 2% | 2% | 1% | 1% |
| 320 | 34944 | 233% | 70% | 35% | 17% | 12% | 8% | 6% | 4% | 3% | 2% | 1% |
| 640 | 68169 | 454% | 136% | 68% | 34% | 23% | 15% | 11% | 8% | 7% | 3% | 2% |

Fig. 6(a)

| 0,0 | 1,0 | 2,0 |
|-----|-----|-----|
| 0,1 | 1,1 | 2,1 |

Fig. 6(b)

| 1,1 | 2,0 | 0,0 |
|-----|-----|-----|
| 1,0 | 2,1 | 0,1 |

Fig. 6(c)

| 2,0 | 0,1 | 1,0 |
|-----|-----|-----|
| 2,1 | 0,0 | 1,1 |

PROTECTION OF DIGITAL IMAGES

RELATED APPLICATIONS

This application is related to and claims priority from U.S. Provisional Patent application No. 61/079,146 titled "Protection of Digital Images," filed Jul. 9, 2008, the entire contents of which are fully incorporated herein for all purposes.

RESERVATION OF COPYRIGHT

This patent document contains information subject to copyright protection. The copyright owner has no objection to the facsimile reproduction by anyone of the patent document or the patent, as it appears in the U.S. Patent and Trademark Office files or records but otherwise reserves all copyright rights whatsoever.

FIELD OF THE INVENTION

This invention relates to the protection of digital images.

DETAILED DESCRIPTION OF PRESENTLY PREFERRED EXEMPLARY EMBODIMENTS OF THE INVENTION

The invention is described with reference to detailed illustrative embodiments. It will be apparent that the invention can be embodied in a wide variety of forms, some of which may be quite different from those of the disclosed embodiments. Consequently, the specific structural and functional details disclosed herein are merely representative and do not limit the scope of the invention.

BACKGROUND & SUMMARY

Creators and owners of digital images require ways to protect those images from unauthorized copying. The problems with unauthorized copying of images is exacerbated by the Internet (more specifically, the World Wide Web), and the ease with which images can simply be copied from most web pages that display them.

Presently, the only way to protect website content from being downloaded is to encrypt it and then require the user to have an external plug-in for his or her browser which will decrypt the image. This approach is not ideal, since it can require special software running on the server (an inconvenience to the presenter of the image) and special software on the user end (an inconvenience to the viewer). Due to these difficulties, many web sites present their text and images unencrypted, and simply use the threat of legal action against copyright infringement to anyone who reuses the content without permission.

BRIEF DESCRIPTION OF THE DRAWINGS

The invention is better understood by reading the following detailed description with reference to the accompanying drawings in which:

FIG. 5 is a table comparing HTML file sizes with original image size;
and
FIGS. 6(A)-6(C) show an example image, a transposition matrix and a resulting new image.

DESCRIPTION

Figure 1:
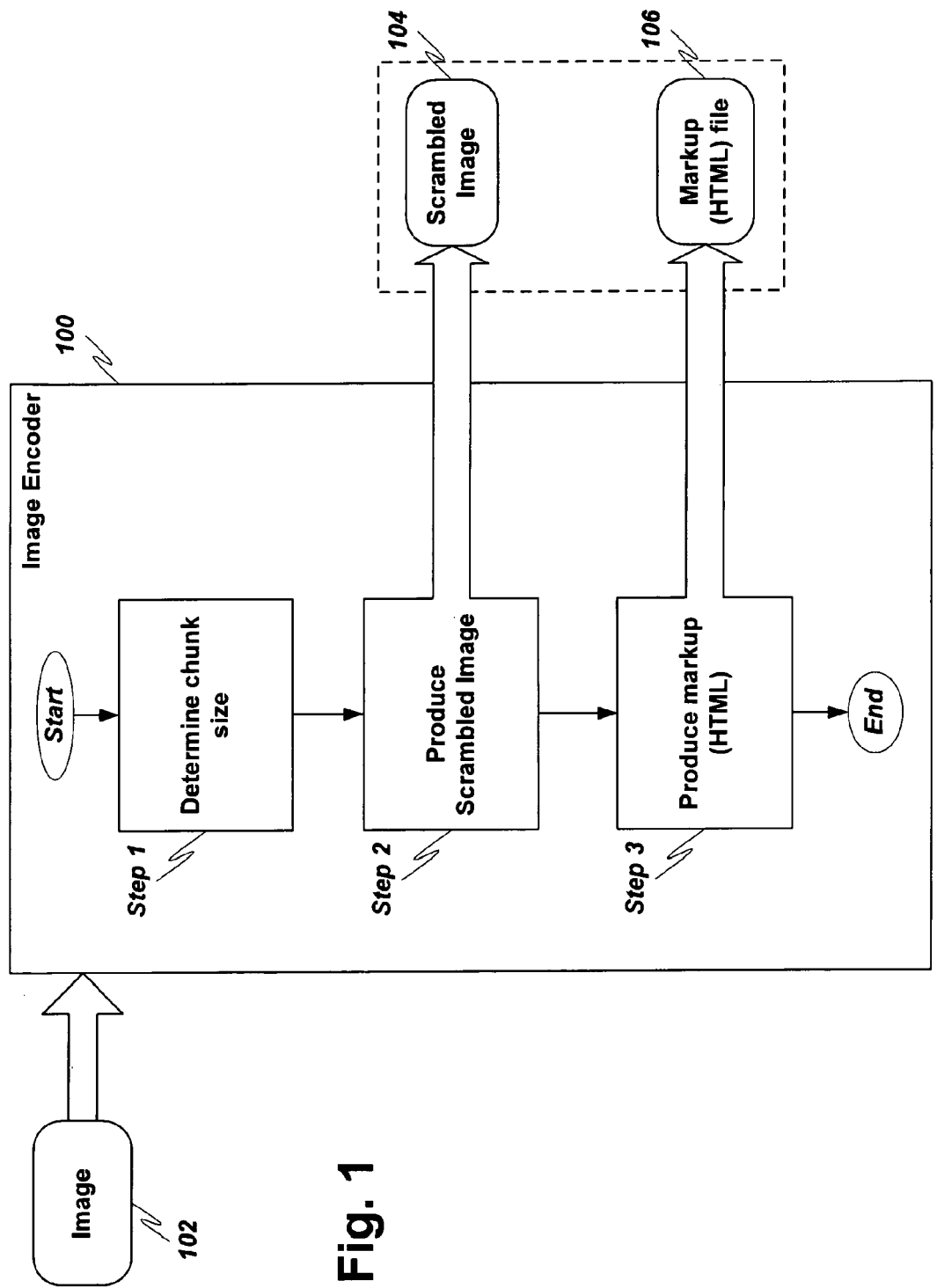
FIG. 1 depicts an image encoder.

FIG. 1 depicts an image encoder 100, the operation of which is described here. The encoder 100 implements a process that takes as input a single source image 102 and produces two separate output files, namely:

a scrambled (or encrypted) version 104 of the input image; and an associated markup file (e.g., an HTML file) 106 that includes a markup description (e.g., a table and style definitions) necessary to unscramble the scrambled image.

The term "encode" is used herein to describe the process of producing the scrambled version of an image, along with the markup file necessary to unscramble the image. Thus, as used herein, an "encoded image file" refers to the scrambled version of the image file and the associated markup file. The terms "encrypt" ("encrypted") are sometimes used herein and mean "encode" ("encoded").

Figure 2A:
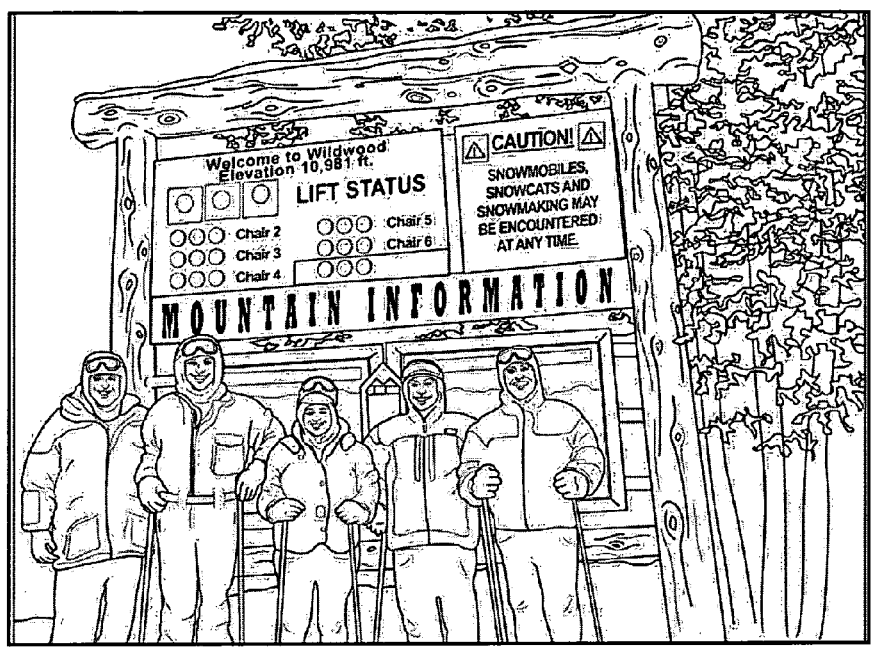
FIG. 2(A) shows an example digital image.
Figure 2B:
FIGS. 2(B)-2(E) show the image of FIG. 2(A) scrambled with different block sizes.
Figure 2C:
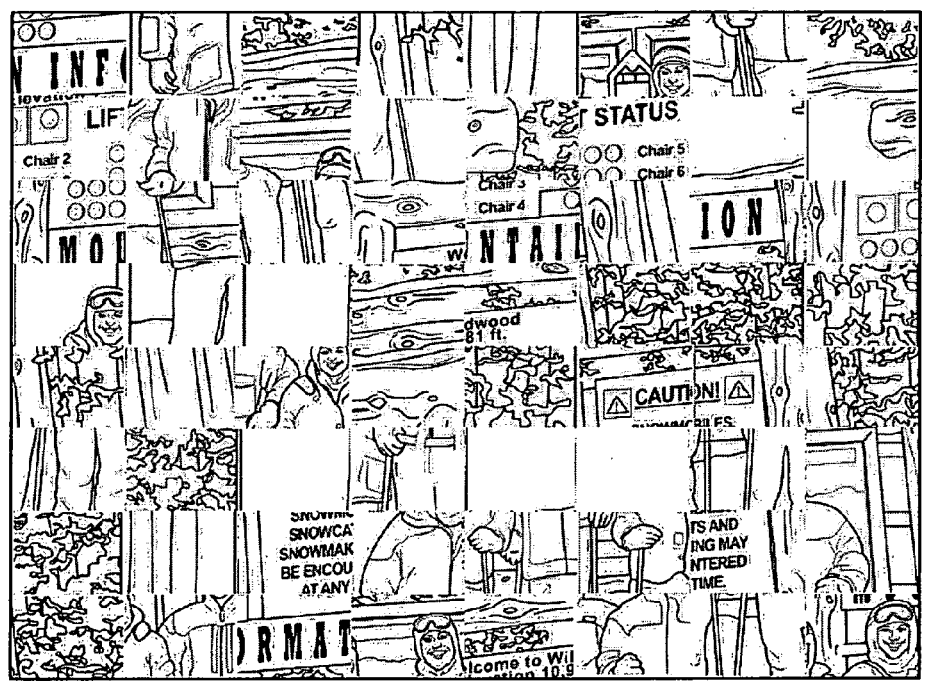
Figure 2D:
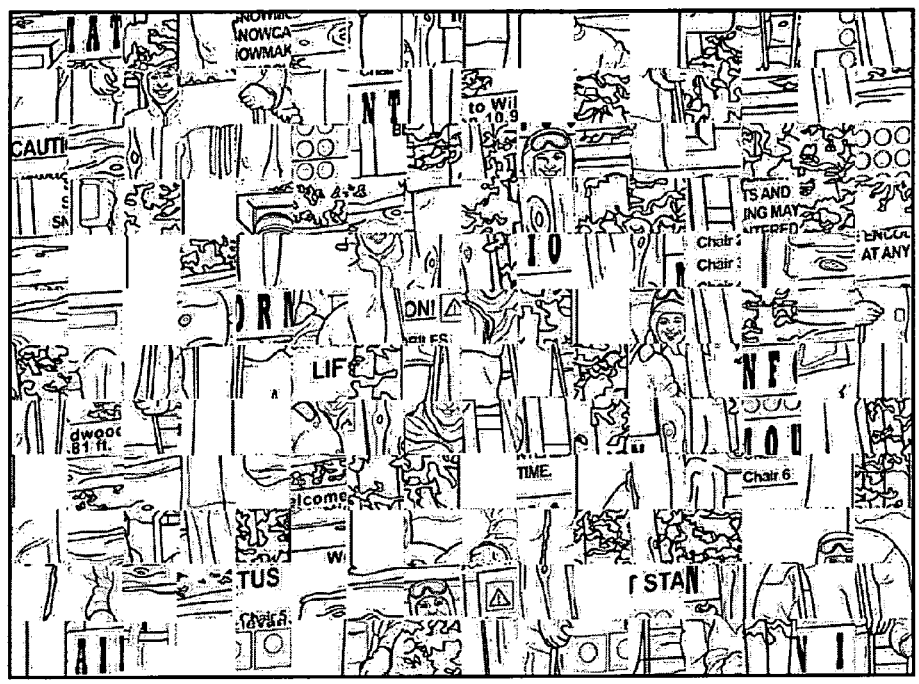

In presently preferred implementations, the original input image 102 is scrambled by treating the input image as being formed of a number of (preferably equal sized) blocks or chunks and then rearranging those blocks (chunks) in a random manner, to form a scrambled image. FIGS. 2(b)-2(d) are scrambled versions of the image of FIG. 2(a), scrambled with different block/chunk sizes. The image blocks or chunks are also referred to herein as pixel sets.

The process carried out by the encoder 100 includes the following three steps (as shown in FIG. 1):

Step 1: Determine the chunk (pixel set) size.
Step 2: Produce the scrambled image.
Step 3: Produce HTML which can unscramble the image.

Each of these steps is described in greater detail below.

Step 1: Determine the Chunk (Pixel Set) Size.

Figure 3:
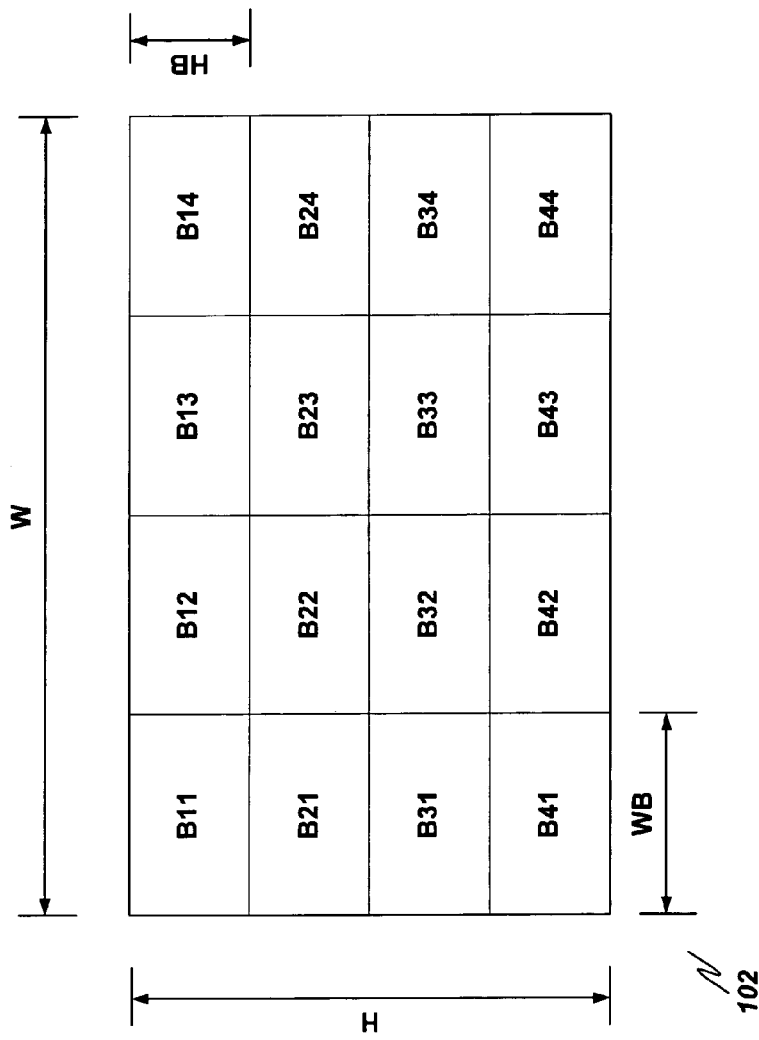
FIG. 3 shows an exemplary original image, divided into chunks or blocks.

As noted above, the input image (i.e., the original image) is logically divided into image chunks (pixel sets), preferably of equal size. FIG. 3 shows an exemplary input (original) image 102 having width W pixels and a height H pixels. The first step determines the size of each pixel set, based, at least in part, on the target number of pixel sets and the image resolution. Preferably the pixel sets (which are preferably rectangles) have a width (WB) which evenly divides the width (W) of the image, and a height (HB) which evenly divides the height (H) of the image. (The process of determining the number of pixel sets is described in greater detail below.)

The result is that the pixel sets will create a scrambled image of identical resolution to the original image. Those of skill in the art will know and understand, upon reading this description, that while it is preferable that the scrambled image have the same resolution as the original image, this is not an absolute requirement of the system. However, having identical resolutions helps both in presentation and in obfuscating the original image (since a rectangle which overshot the edge of the picture might contain only black where it overshot the image, and thus when part of the scrambled image, would clearly be a member of the picture's edge, and a clue to the original picture composition).

In the example shown in FIG. 3, the image 102 has sixteen (16) pixels sets (the blocks or chunks labeled B11, B12, ..., B44), each a rectangle of width WB pixels and height HB pixels.

The currently preferred process begins with a target of 300 pixel sets (i.e., 300 chunks), and a minimum of two rows. If the total size of the original image is less than 300 pixels, then the process uses a single pixel as the pixel set (chunk) size, by default. Those of skill in the art will know and understand, upon reading this description, that different values could be used as a target number of pixel sets.

Those of skill in the art will know and understand, upon reading this description, that the pixel sets should be non-overlapping.

Step 2: Produce the Scrambled Image

Once the pixel sets have been determined (in step 1), a scrambled image is produced. A randomizer may be used determine a new location in the scrambled image for each block of the original image. Those of skill in the art will know and understand, upon reading this description, that each new random location is used only once.

Although this description uses the term "random", those of skill in the art will know and understand, upon reading this description, that a pseudo-random function of the kind provided with most programming languages will suffice to produce the values needed to scramble the original image. In a preferred implementation, written in the programming language PHP, the built-in function "rand" is used.

It should be noted that the image type becomes extremely important at this stage. It is preferable to use a file with a lossless image file compression, such as GIF (Graphics Interchange Format) or PNG (Portable Network Graphics). This contrasts with the use of a JPEG (Joint Photographic Experts Group) image, which is lossy. The reason for this is that lossy image compression will attempt to smooth colors, which will smooth the edges between chunks in the scrambled version of the images. This may not be noticeable in the scrambled version of the image, but may be very noticeable in the edges of the unscrambled image, since they are not smoothed/blended after being descrambled. Therefore, it is further preferable to use a PNG file type for the scrambled image, since it holds significantly more colors than a GIF and this process will likely be used on high resolution photographs.

Step 3. Produce the Markup (HTML)

Once the scrambled image 104 is created (in step 2), the same random values must be used to create the markup—HTML file 106.

The function of the HTML is to render the scrambled image 104 so that it appears as the original image 102. To do this, an HTML table is created (having the same size as the original image), and with a cell for each chunk of the image, and the chunks of the scrambled image are displayed at the appropriate places (cells) in the table. More specifically, if the original image is split into M rows of N chunks each, then the corresponding HTML table will define M rows of N cells each, and then the chunks of the scrambled image are displayed as background portions of defined table.

An exemplary implementation of an algorithm for producing the scrambled image is presented here. Those of skill in the art will know and understand, upon reading this description, that the invention is not limited to this or any particular implementation or algorithm.

Step 1: Determine Chunk Size

1. Create two arrays, one of the factors of the x resolution of the original image and one of the y resolution of the original image.
2. Form a matrix of the multiples of those factors, so as to determine how many chunks they will create.
3. Select the combination (i.e., pair) of factors from this matrix which results in the fewest chunks, while keeping it less than a certain value (in presently preferred implementations, this value may be preset at 300 unless the whole image resolution is lower than that, in which case use the chunk size should be 1 pixel by 1 pixel).
4. If the x length and y length could be switched (i.e., both resolutions are evenly divisible by both numbers, and the y length is greater, then switch the x and y resolutions. This is an HTML optimization that avoids a few extra column declarations, which optimizes the HTML coding by reducing the number of "<TR>" and "</TR>" declarations.

Step 2: Produce Scrambled Image

Figure 4:
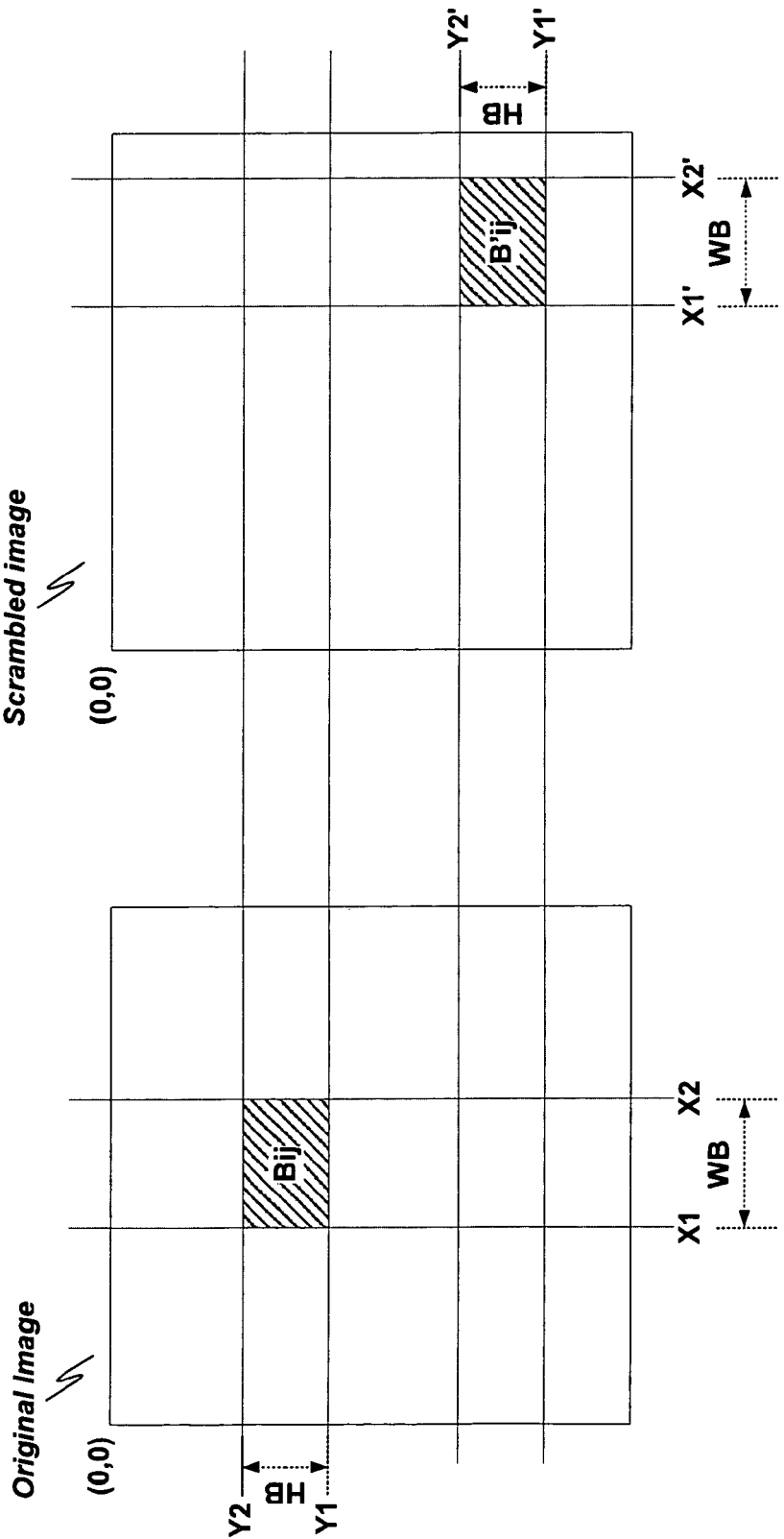
FIG. 4 shows an example of how to compute transformations from a scrambled image to recreate the corresponding original image.

5. Set x_length=wb, the width of the block (in pixels)
6. Set y_length=hb, the height of the block (in pixels)
7. Declare four matrices, each of x_length columns and y_length rows:
   Denote them: NewImage_X_values, NewImage_Y_values, Offset_X_values, Offset_Y_values
   Comment: "NewImageMatrix(i,j)" will refer to the block (NewImage_X_values[i], NewImage_Y_values[j]) and "OffsetMatrix(i,j)" will refer to the point (Offset_X_values[i], Offset_Y_values[j]).
9. Set All points in NewImage_X_values and NewImage_Y_values to −1 so that if New Image Matrix (NewImage_X_values[i]=−1 and NewImage_Y_values [j]=−1 (i.e., NewImageMatrix(i,j)=block−1, −1) then block (i,j) in the New Image is an unused block (i.e., the block has not been assigned a random part of the original image).
10. Loop through each block of the presently empty OffsetMatrix:
    For each value y=0 to y_length−1:
      For each value x=0 to x_length−1:
        Get an unused random cell from NewImageMatrix and save the block to temp values a,b where a=the NewImage_X_value and b=the NewImage_Y_value Set OffsetMatrix(x,y)=(a,b) Set NewImageMatrix(a,b)=(x,y)
11. Create a new true-color image the same resolution as original image
12. Loop through all blocks of the original image:
    for y=0 to y_length−1
      for x=0 to x_length−1
        copy the rectangle from originalImage from corner x*rectangle Width to y*rectangleHeight and place it on NewImage in the rectangle NewImageMatrix([x] [y]*rectangle Width, NewImage_Y_values[x] [y]rectangleHeight
13. Save NewImage as a PNG file Step 3: Produce Html 14. Declare a style setting with NewImage as a non-repeating background image.
15. Create a table in the markup language with width w and height h, identical to the new image width and height in pixels.
16. Loop through each cell of the table:
    For y=0 to y_length−1
      Declare a new column (e.g., "<TR>")
      For x=0 to x_length−1 {
        Declare a new cell with the style above
        Set the background position offset to move left by Offset_X_values [x] [y]*rectangleWidth and up by Offset_Y_values [x] [y]*rectangleHeight Comment: Note that the left-most cell moving left should wrap around and put it at the position of the furthest-most right cell. This is done automatically when using cascading style sheets with most Internet browsers. Also note that in each cell, the upper-left corner of the image is being presented in that cell's space, so the offset only needs to move the image so that the targeted chunk is in the upper-left corner. So whichever chunk is in the upper-left to begin with will not need to be offset when it comes time to display that chunk.
}
   Declare the end of the column (e.g., "</TR>")
}
Declare the end of the table FIG. 4 shows an example of how to compute transformations from a scrambled image to recreate the corresponding original image. Note that HTML considers the top left corner of an image to be the origin, position (0, 0). In the example of FIG. 4, a block denoted Bij of the original image is positioned (in the original image) with its lower left corner at position (X1, Y1). The block Bij has height HB=Y2−Y1, and width WB=X2−X1. In the scrambled image, the same block (denoted B'ij) is positioned with its lower left corner at position denoted (X1', Y1').

In order to recreate the original image, it is necessary to render (draw) block B'ij at its correct position. To do so, the block B'ij should be drawn with its origin offset by:
$\Delta x = X\_Offset[x,y]*rectangleWidth*-1$ pixels (i.e., move the image $X\_Offset[x,y]$ blocks to the left)
$\Delta y = Y\_Offset[x,y]*rectangleWidth*-1$ pixels (i.e., move the image $Y\_Offset[x,y]$ blocks up)

One way to consider the reproduction of the original is as follows: for each block B'ij (at position (X1', Y1')) in the scrambled image: shift (offset) the scrambled image by $\Delta x$, $\Delta y$, and then reproduce a block of size WB×HB.

The generated markup (HTML) file 106 contains two parts: a style definition, which designates the image file to be used as the background for each cell, and the table itself.

The Style Definition

The following HTML style definition may be used:

```
<style>
  Matrix_class {background:transparent url('matrix-url'); no-repeat;}
</style>
``` where "Matrix_class" is a class name and "matrix-url" is the name (a URL—Uniform Resource Locator) of an image file to be used as a background. This style definition, when applied to an element, will cause the background of that element (i.e., its rendering surface) to be the image in the URL "matrix". The word "transparent" in the style is used to hide this image when the browser prints the page. The parameter "no-repeat" instructs the cell not to continue repeating the image if the cell is taller or wider than the entire original image. This should not matter, since the cell is set to the size of the image chunk, which will always be smaller than the original image.

A description of HTML is provided in "HTML 4.01 Specification, W3C Recommendation 24 Dec. 1999", and a description of HTML styles is provided in "Cascading Style Sheets Level 3 Revision 1 (CSS 2.1) Specification, W3C Candidate Recommendation," Jul. 19, 2007, (hereinafter "the Style Reference"), the entire contents of each of which are fully incorporated herein by reference for all purposes. The syntax and semantics of the HTML "background" style element are described in Section 14 ("Colors and Backgrounds") of the Style Reference.

Those of skill in the art will know and understand, upon reading this description, that this invention is not limited to HTML in general or to any version of HTML in particular.

It is preferable to use a different class name for each image so that multiple images can be displayed on a single page.

Preferably remove the file extension from the image file name so as to further deter someone from downloading even the scrambled image. For example, in the exemplary style shown above, 'matrix' is the file name for the 'matrix.png' file, where the '.png' extension has been removed.

Preferably place the style code in the header of the HTML document. This will cause most browsers rendered the image before the table is rendered and will alleviate the risk of the table rendering without the proper background having been set.

Example

In a file with two images, "image1" and "image2", and a background at "http://www.foo.com/image1" and "http://www.foo.com/image2", respectively, the following two styles may be used:

```
<style>
  Image1_class {background:transparent
    url("http://www.foo.com/image1"); no-repeat;}
</style>
<style>
  Image2_class {background:transparent
    url("http://www.foo.com/image2"); no-repeat;}
</style>
```

The Table Definition:

The following HTML code provides an exemplary table definition for a table to display a scrambled image. In this example the image is comprised of chunks each being 7 pixels wide by 10 pixels high.

```
<table border=0 cellpadding=0 cellspacing=0 bgcolor='RED'>
  <tr>
    <td class='matrix_class' style='background-position:-105px -140px;>
      <img src='nothing.gif' width=7 height=10>
    </td>
    <td class='matrix_class' style='background-position:-119px -140px;>
      <img src='nothing.gif' width=7 height=10>
    </td>
    ....
    ....
    ....
  </tr>
</table>
```

In the exemplary table code above the cell style tag has the form:
"<td class='matrix_class" style='background-position: $\Delta Xpx$ $\Delta Ypx;$><img src='spacer.gif' width=WB height=HB>"

The cell style tag declares the offset of the background position. This offset is relative to the point 0,0 of the image, since each cell attempts to display the original image at point 0,0 (e.g., point 2, 3 may be scrambled and now presented at point 5, 5, so the table cell 2, 3 should offset the background position x-5, y-5). Essentially this class and style informs the browser (or rendering program to display a (WB×WH)-sized portion of the background image (the scrambled image) starting at the cell's position offset by the location of the desired chunk (ΔX, ΔY).

Since some browsers may incorrectly ignore the defined table cell sizes, a spacer should be used to ensure the integrity of the cell width and height. In this example, this is accomplished using a file named "nothing.gif" which may include a monotone image set to be transparent, or the like. (Note that this spacer file needs to be included only once even when presenting multiple images).

The HTML table should be defined to have no border, cell padding, or cell spacing.

Example

Consider an original sample image with six chunks, as shown in FIG. 6(A) Sample encryption values are shown in the following table:

| Original X | Original Y | New Random X | New Random Y |
|---|---|---|---|
| 0 | 0 | 1 | 1 |
| 1 | 0 | 2 | 0 |
| 2 | 0 | 0 | 0 |
| 0 | 1 | 1 | 0 |
| 1 | 1 | 2 | 1 |
| 2 | 1 | 0 | 1 |

The resulting transposition matrix (with values RandomX and RandomY in positions X,Y) is shown in FIG. 6(b). The resulting new image matrix is shown in FIG. 6(c) (with values X and Y in positions RandomX, RandomY).

Offsetting each cell of the NewImage matrix by the transposition matrix reveals the original positions:

| | | |
|---|---|---|
| Cell Position (0, 0): | Cell Position (1, 0): | Cell Position (2, 0): |
| Offset left 1, up 1, revealing cell 0, 0 | Offset left 2, up 0, revealing cell 1, 0 | Offset Left 0, up 0, revealing cell 2, 0 |
| Cell Position (0, 1): | Cell Position (1, 1): | Cell Position (2, 1): |
| Offset left 1, up 0, revealing cell 0, 1 | Offset left 2, up 1, revealing cell 1, 1 | Offset left 0, up 1, revealing cell 2, 1 |

Determining the Appropriate Number of Pixel Sets

Since HTML tables require a few extra characters to declare each row, the HTML output file should preferably have fewer rows than columns. For example, it is preferable to divide an image into three rows and one hundred columns, rather than one hundred rows and three columns. The complexity of the scrambled image, from the point of view of someone trying to de-scramble it, would be the same either way, but the size of the HTML file will differ. As the number of table cells (i.e., pixel chunks) increases, the effects of having more columns than rows become more apparent, for example, for an exemplary image:

Dividing the image into 600 slices with a single row and 600 columns, the size of the HTML file will be 63 kb.
Dividing the image into 600 slices with 20 columns and 30 rows, the size of the HTML file will be 66 kb; and
dividing the image into 600 slices with a single column and 600 rows, the size of the HTML file will be 92 kb.

Therefore, when using HTML it is always more efficient to use more rows than columns. (Those of skill in the art will know and understand, upon reading this description, that a different markup scheme may produce different efficiencies.) However, a single row with several columns is not a sufficient solution, because it is easier to reorganize an image if you only have to decide whether the chunk you are looking at should be moved to the left or right, as opposed to deciding left, right, up, or down. Therefore, although it is most efficient space-wise to use only columns when dividing the image, it is recommended that the image have at least two rows, and preferably more than two rows.

Suggested Number of Chunks:

The image should preferably be divided into enough pixel sets or chunks so as to deter a normal end user from rearranging the image by hand, but not into so many slices that the corresponding markup (e.g., HTML) decryption (rearranging) file is unnecessarily large in comparison to the source image size. This is particularly true when the presenter has multiple images per page, and wants the decryption for each image to be relatively light.

Figure 2E:
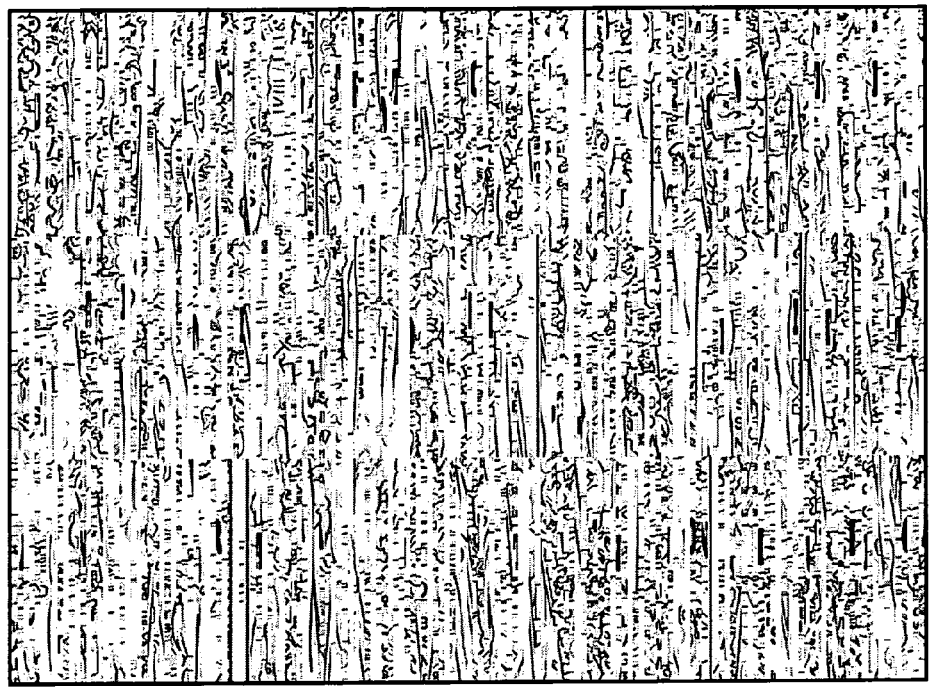

The number of chunks to use depends on the intended use and the degree of security required. Most photographers will want to present images with resolutions of at least 640×480. FIGS. 2(b)-2(d) are examples of a 640×480 image (original in FIG. 2(a)) with different numbers of chunks:

FIG. 2(b) shows 32 chunks;
FIG. 2(c) shows 64 chunks;
FIG. 2(d) shows 192 chunks; and
FIG. 2(e) shows 434 chunks.

The number of chunks used may also depend, at least in part, on the type of information being scrambled. As can be seen from these examples, at 64 chunks, there is still plenty of information contained in each chunk to help a user figure out where each one goes. But at 192 chunks, it would be prohibitively difficult to unscramble the image manually. And at 434 chunks the chunks are themselves largely unrecognizable.

The 192 chunk image in FIG. 2(d) is composed of 192 40×40 squares. A non-square shape, such as an "S" shape, would likely even increase the difficulty of rearranging the image. For most images, 100 to 200 chunks will be enough. However, if the large image is composed of smaller components which are individually valuable (i.e., if the small, unscrambled square may be valuable), then it may be necessary to use more than 200 chunks. Table I (in FIG. 5) shows the HTML decryption source sizes as a function of original image sizes.

Decoding 200 chunks requires 18 kb, which is less than the size of about 25% of most medium to high quality images. Decoding 100 chunks requires only 12 kb, also a fairly insignificant number relative to the image sizes. For extremely small images, using 60 chunks is still sufficiently prohibitive, and has an overhead of only 8 kb.

When presenting standard high-quality photographs, which tend to be at least 300 kb each, the site is only burdened by about a 6% increase in file size when the images are encrypted using 160 separate chunks. This is a relatively low price to pay in bandwidth for increased security.

Appendix II hereto, which is considered part of this application, contains the HTML listing (style and table definitions) for the image in FIG. 2(b).

Additional Protection

Although the above-described technique prevents a user from obtaining a copy of the original image, a user may still obtain a screen shot of the rendered image. For protection against screen shots, the markup documents may include a single blank Flash animation which clears the user's clipboard regularly (e.g., once per every second). This would effectively prevent the end-user from being able to capture the unscrambled image directly from his screen without using special software. The Flash object only needs to be included a single time on the page in order to prevent screen captures from any photo on the page.

Sample code to include a flash object is shown below:

```
<OBJECT id='nocopy'><PARAM NAME=movie
VALUE='nocopy.swf'><PARAM NAME=quality VALUE=high><PARAM
NAME=bgcolor VALUE=#FFFFFF><EMBED src='nocopy.swf'
quality=high bgcolor=#FFFFFF WIDTH='1' HEIGHT='1'
NAME='nocopy' ALIGN=" TYPE='application/x-shockwave-flash'
PLUGINSPAGE='http://www.macromedia.com/go/getflashplayer'></
EMBE
D></OBJECT>
```

The source code for the "nocopy.swf" file is listed here:
Flash Source:
Loop a frame which executes the function:
System.setClipboard("Copy/Paste has been disabled while this page is open.");

The flash could also be configured to obscure the whole webpage while it is disabled and only become transparent when enabled Note: The Flash source code need not be modified since its function is purely outside of the image. For further image protection, the user could create a dynamic Flash file which itself contained the decryption code in HTML form or another form, and which dynamically imported the scrambled image. This would have the added benefit of preventing the end-user from seeing the image if Flash were disabled.

The technology works by encrypting information at the presentation-level, as opposed to the bit level. For an image, this might mean selecting certain parts of the image and moving them to a different part of the image. The result is a mosaic in which each of the original chunks is represented, but the chunks rearranged so that it is not feasible to put the data back together again without creating a program to read the decryption code, unscramble the image, and save it as a new file.

The method presented provides a significant obstacle to a user's ability to download web content. It accomplishes this by transferring the information in an encrypted manner, but in a way that allows the information to be decrypted by the web browser alone, without the use of any additional plug-ins or third party software.

This technology will prove useful any time a web site owner wants to provide information to a user and limit what the user can do with that content. For example, users can see and print proprietary information, but are inhibited from saving it to their hard-drives. In conjunction with screen capture software and a command to prevent printing, users can significantly increase the security of proprietary images they present online, and the value of this property. It can also increase their sales of the image, as they can charge users not only to have high-resolution copies of the images, which is common, but also to download any version of the image, since the version the viewer sees is now much harder to steal.

In one example use of this invention, a content provider may have a library of thousands of high quality images which it offers for sale. The content provider may wish to display copies of those images to end users, while at the same time preventing the images from being copied. In this case, the content provider may produce a lower quality version of each image, i.e., a version with a lower resolution. Each of those lower resolution images can then be encoded using the image encoder described herein, and the encoded images can be displayed on the content provider's web site. In this manner, customers of the content provider can see copies of the images that they may want to buy, but they are not given access to the high-resolution versions of the images or even to the lower-resolution version, except in encoded form.

Such an application would be useful for professional photographers who want to be able to show "proofs" to their potential customers, but, at the same time, want to avoid having those proofs copied.

In general, a preferred environment for the present invention is one where copyrighted or otherwise "protected" material needs to be shared with users, but not provided over to them directly. An example is a photographer who wants to show the pictures he's taken, but wants to charge the viewer to download the pictures. Currently, without the present invention, showing the viewers the images is effectively tantamount to giving the viewer a digital copy. The invention can be incorporated into an online photo gallery, or directly into personal websites.

While the invention has been described with respect to images, Those of skill in the art will know and understand, upon reading this description, that images are not limited to photographic images, and that an image can also be used on text provided the text is rendered as an image. In this manner, the present invention may be able to provide images corresponding, e.g., to the pages of a book. In this manner an online book seller may offer a preview of any page of a book without concern that the book will be copied.

The image encoder of this invention may run on any general purpose computer having a processor and memory. Those of skill in the art will know and understand, upon reading this description, that the encoder may be implemented in software or hardware or a combination thereof. The encoder may be part of a larger package of tools (e.g., as a plugin) or it may be provided as a stand-alone tool. The image encoder may built in to hardware such as a digital camera, as embedded software.

This invention solves the problem of web browsers being able to download copyrighted image content extremely easily. Additionally, it solves the problem in a way that does not require any third-party applications, which is critical when presenting your content to the general public.

Those of skill in the art will know and understand, upon reading this description, that this invention provides numerous advantages over prior approaches. For example, the approach described herein requires only one http GET request, thereby reducing the time it takes to load the image as compared to loading each chunk as a separate image. The advantage of the method over standard watermarking is that it serves as a deterrent to thieves without obscuring the image in any way. The advantage of the method over digital watermarking is that it impedes the viewer's ability to steal the image in the first place, instead of deterring the user from using it once it is stolen. However, the present method could be used in conjunction with digital watermarking.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

Exemplary source code of an implementation of aspects of the invention is given below. This source code is written in the PHP programming language. Those of skill in the art will know and understand that this code only provides an exemplary way of implementing the various aspects of the invention. The scope of the invention is not intended to be in any way limited by the source code or by any limitations imposed by this code.

The various mechanisms described herein may be implemented in hardware, software or a combination thereof. When implemented in software, they may be implemented in any type of appropriate interpreted or compiled programming language. When implemented fully or partially in software, aspects of the invention can reside on any memory or storage medium, including but not limited to a ROM, a disk, an ASIC, a PROM and the like. While the invention has been described with reference to particular mechanisms (algorithms, processes and functions) and architectures, one skilled in the art would realize that other mechanisms and/or architectures could be used while still achieving the invention.

When the various mechanisms of the present invention are running on a particular machine (e.g., at a client or on a server), they may reside in the memory of the machine or on a storage device or in a combination. Further, while many of the operations have been shown as being performed in a particular order, one skilled in the art would realize that other orders, including some parallelization of operations, are possible and are considered to be within the scope of the invention.

The present invention has been described above in connection with a preferred embodiment thereof; however, this has been done for purposes of illustration only, and the invention is not so limited. Indeed, variations of the invention will be readily apparent to those skilled in the art. Such variations also fall within the scope of the invention. Thus, while the invention has been described with reference to the certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather extends to all equivalent structures, acts, and, materials, such as are within the scope of the appended claims.

The processing described may be performed by a properly programmed general-purpose computer alone or in connection with a special purpose computer. Such processing may be performed by a single platform or by a distributed processing platform. In addition, such processing and functionality can be implemented in the form of special purpose hardware or in the form of software being run by a general-purpose computer. Any data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, a computer-readable media may comprise any form of data storage mechanism, including such existing memory technologies as well as hardware or circuit representations of such structures and of such data.

Thus are provided a method and apparatus for protection of digital images. Those skilled in the art will appreciate, upon reading this description, that the present invention can be practiced by other than the described embodiments, which are presented for purposes of illustration and not limitation, and the present invention is limited only by the claims that follow.

EXEMPLARY SOURCE CODE LISTING

```
//The function GetAltered Matricies addresses Step 2.
function GetAlteredMatricies($x_length, $y_length,
                            $rectangleWidth, $rectangleHeight){
   //Declare two matricies, $oldMatrix and $newMatrix
      $matrix_NewX = array($x_length);
      $matrix_NewY = array($x_length);
      $matrix_New_X_Transposed = array($x_length);
      $matrix_New_Y_Transposed = array($x_length);
      for ($y = 0; $y < $y_length; $y++){
         $matrix_NewX[$y] = array($y_length);
         $matrix_NewY[$y] = array($y_length);
         $matrix_NewX_Transposed[$y] = array($y_length);
         $matrix_NewY_Transposed[$y] = array($y_length);
      }
   //set all values to −1
   for ($y = 0; $y < $y_length; $y++){
      for ($x = 0; $x < $x_length; $x++){
         $matrix_NewX[$x] [$y] = −1;
         $matrix_NewY[$x] [$y] = −1;
      }
   }
   for ($y = 0; $y < $y_length; $y++){
      for ($x = 0; $x < $x_length; $x++){
      $thisRandomUnusedPixel = RandomUnusedPixel(
                                                $matrix_NewX,
                                                $matrix_NewY,
                                                $x_length, $y_length);
      $tempRandomX = $thisRandomUnusedPixel[0];
      $tempRandomY = $thisRandomUnusedPixel[1];
      $matrix_NewX[$tempRandomX][$tempRandomY] = $x;
      $matrix_NewY[$tempRandomX][$tempRandomY] = $y;
      $matrix_NewX_Transposed[$x][$y] = $tempRandomX;
      $matrix_NewY_Transposed[$x][$y] = $tempRandomY;
      }

}
   $returnResults = array(2);
   $returnResults[0] = $matrix_NewX;
   $returnResults[1] = $matrix_NewY;
   $returnResults[2] = $matrix_NewX_Transposed;
   $returnResults[3] = $matrix_NewY_Transposed;
   return $returnResults;
}
   function RandomUnusedPixel($matrix_NewX, $matrix_NewY,
                              $x_length, $y_length){
do {
         $tempRandomX = rand(0,$x_length−1);
         $tempRandomY = rand(0,$y_length−1);
} while ($matrix_NewX[$tempRandomX][$tempRandomY] != −1);
      $returnArray = array(2);
      $returnArray[0] = $tempRandomX;
      $returnArray[1] = $tempRandomY;
      return $returnArray;
   }
   function ReturnImage($originalImage, $matrix_NewX,
                        $matrix_NewY, $x_length, $y_length,
                        $rectangleWidth, $rectangleHeight){
      $in_image = imagecreatefromjpeg($originalImage);
      $destination_x = imagesx($in_image);
      $destination_y = imagesy($in_image);
      $im_new = imagecreatetruecolor($destination_x,
$destination_y);
      for ($y = 0; $y < $y_length; $y++){
         for ($x = 0; $x < $x_length; $x++){
            imagecopy($im_new, $in_image,
                      $x*$rectangleWidth, $y*$rectangleHeight,
                      $matrix_NewX[$x][$y]*$rectangleWidth,
                      $matrix_NewY[$x][$y]*$rectangleHeight,
                      $rectangleWidth, $rectangleHeight);
         }
}
$explodedFileName = explode('.',$_FILES['file']['name']
);
$outfile = $explodedFileName[0];
         imagepng($im_new, 'images/' . $outfile);
         imagedestroy($in_image);
         return $outfile;
      }
```

EXEMPLARY SOURCE CODE LISTING

```
function ReturnOffset($newX, $oldX, $newY, $oldY,
                     $rectangleWidth, $rectangleHeight){
    return "background-position:" .
        (($newX*-$rectangleWidth)) . "px " .
        (($newY*-$rectangleHeight)) . "px;";
}
/*
The function ReturnFactors assists with Step 1 by returning the
factors of the number n. This assists in determining the optimal
number of chunks
*/
function ReturnFactors($n){
    $factorArray = array( );
    $factorCount = 0;
    for ($i = 2; $i <= $n; $i++){
        if ($n % $i == 0){
            $factorArray[$factorCount] = $i;
            $factorCount++;
        }
    }
    return $factorArray;
}
/*
The function FindOptimumNumberOfSlices completes Step 1,
utilizing the function ReturnFactors(n).
*/
function FindOptimumNumberOfSlices($x_length, $y_length,
                     $imageResolution_X,
                     $imageResolution_Y){
    $x_factors = ReturnFactors($imageResolution_X);
    $x_factors_length = count($x_factors);
    $y_factors = ReturnFactors($imageResolution_Y);
    $y_factors_length = count($y_factors);
    $x_length = $imageResolution_X;
    $y_length = $imageResolution_Y;
    $optimalResolution = 300; /* This value could be changed
        if (($imageResolution_X * $imageResolution_Y) <
            $optimalResolution) {
            $optimalResolution = ($imageResolution_X *
                     $imageResolution_Y);
        $resultsArray = array($imageResolution_X,
                     $imageResolution_Y);
    } else {
        for ($i = 0; $i < $y_factors_length; $i++){
            $multiplesMatrix[$i] = array($x_factors_length);
            for ($j = 0; $j < $x_factors_length; $j++){
                $multiplesMatrix[$i][$j] = $y_factors[$i] * $x_factors[$j];
                if (($multiplesMatrix[$i][$j] >=$optimalResolution) AND
                    ($multiplesMatrix[$i][$j] < ($x_length * $y_length)))){
                    $x_length = $x_factors[$j];
                    $y_length = $y_factors[$i];
                }
            }
        }
        /*
        As an HTML optimization, if the y value is greater than the x
        value, and both are evenly divisible by the other, then switch
        them to save a few "<TR>s"
        */
        if (($y_length > $x_length) AND
            ($imageResolution_X % $y_length == 0) AND
            ($imageResolution_Y % x_length ==0)) {
            $tempX = $x_length;
            $x_length = $y_length;
            $y_length = $tempX;
        }
        $resultsArray = array($x_length, $y_length);
    }
    return $resultsArray;
}
//Main body of the code
if(is_uploaded_file($_FILES['file']['tmp name'])) {
$explodedFileName = explode('.',$_FILES['file']['name']
);
$outfile = $explodedFileName[0];
$firstChar = ORD($outfile[0]);
/* The following code is executed before Step 1. It makes sure
the file name will be valid. */
if (($firstChar < 65) OR
    ($firstChar > 90 AND $firstChar < 97) OR
    ($firstChar > 122)) {
        $echoHTML .= "Your file must start with a letter.";
        $className = 'a' . $outfile;
}
$originalImage = $_FILES['file']['tmp_name'];
$size = getimagesize($originalImage);
$htmlData = ""; //This string will store the HTML Markup
$echoHTML = ""; //This string will store the output for this
page, which includes HTML markup and some other information about
the success of the encryption.
$htmlData .= "<html>\n<head>\n<title>Show Encrypted
Image</title>";
$echoHTML .= "<html><head><title>Show Encrypted Image</title>";
//BEGIN STEP 1:
$imageResolution_X = $size[0];//640;
$imageResolution_Y = $size[1];//480;
$multiplesMatrix = array($y_factors_length);
$lengthsArray = FindOptimumNumberOfSlices($x_length, $y_length,
                     $imageResolution_X,
                     $imageResolution_Y);
$x_length = $lengthsArray[0];
$y_length = $lengthsArray[1];
$rectangleWidth = $imageResolution_X/$x_length;
$rectangleHeight = $imageResolution_Y/$y_length;
$q = chr(34);
//BEGIN STEP 2:
    $newMatricies = GetAlteredMatricies($x_length,$y_length,
                     $rectangleWidth,
                     $rectangleHeight);
    $matrix_NewX = $newMatricies[0];
    $matrix_NewY = $newMatricies[1];
    $matrix_NewX_Transposed = $newMatricies[2];
    $matrix_NewY_Transposed = $newMatricies[3];
//BEGIN STEP 3
$htmlData .=
"<!--- If you're using multiple images, put all of the info in
the <style>
tags together here -->\n";
$echoHTML .= "<style>\n";
$htmlData .= "\n<style>\n";
$outputimage = ReturnImage($originalImage, $matrix_NewX,
$matrix_NewY,
                     $x_length,$y_length,
                     $rectangleWidth, $rectangleHeight);
$echoHTML .= "." . $className .
" _class {background:transparent url('images/" .
$outputimage .
"'); no-repeat;} \n";
$htmlData .= "." . $className .
" _class {background:transparent url('" .
$outputimage . "'); no-repeat;} \n";
$echoHTML .= "</style></head>\n<body bgcolor='#ffffff'> \n";
$htmlData .= "</style>\n</head>\n<body bgcolor='#ffffff'> \n";
$echoHTML .= "<OBJECT id='nocopy'><PARAM NAME=movie
VALUE='nocopy.swf'><PARAM NAME=quality VALUE=high><PARAM
NAME=bgcolor
VALUE=#FFFFFF><EMBED src='nocopy.swf' quality=high
bgcolor=#FFFFFF
WIDTH='1' HEIGHT='1'
NAME='nocopy' ALIGN='' TYPE='application/x-shockwave-flash'
PLUGINSPAGE='http://www.macromedia.com/go/getflashplayer'>
</EMBED></OBJECT> \n";
$htmlData .="<!-- You only need to include the object below one
time in the
   page and it will prevent screen shots for all images on the page
-->\n";
$htmlData .= "<OBJECT id='nocopy'><PARAM NAME=movie
VALUE='nocopy.swf'><PARAM NAME=quality VALUE=high><PARAM
NAME=bgcolor
   VALUE=#FFFFFF><EMBED src='nocopy.swf' quality=high
bgcolor=#FFFFFF
WIDTH='1' HEIGHT='1'
NAME='nocopy' ALIGN='' TYPE='application/x-shockwave-flash'
PLUGINSPAGE='http://www.macromedia.com/go/getflashplayer'>
</EMBED></OBJECT> \n";
$echoHTML .= "<table border=0 cellpadding=0 cellspacing=0
```

EXEMPLARY SOURCE CODE LISTING

```
bgcolor='RED'>\n";
$htmlData .= "<table border=0 cellpadding=0 cellspacing=0
bgcolor='RED'>\n";
for ($y = 0;$y < $y_length; $y++){
    $echoHTML .= "<tr> \n";
    $htmlData .= "<tr> \n";
    for ($x = 0; $x < $x_length; $x++){
        $echoHTML .= "<td class='" . $className .
"_class' style='" .
ReturnOffset($matrix_NewX_Transposed[$x][$y],
$x,$matrix_NewY_Transposed[$x]
[$y], $y, $rectanglewidth, $rectangleHeight) .
"'><img src=' nothing.gif' width=" .
$rectangleWidth . " height=" . $rectangleHeight . "></td> \n";
        $htmlData .= "<td class='" . $className . "_class'
style='" .
ReturnOffset($matrix_NewX_Transposed[$x][$y],
$x,$matrix New_Y_Transposed[$x]
[$y], $y, $rectangleWidth, $rectangleHeight) .
"'><img src='nothing.gif' width=" . $rectangleWidth .
" height=" . $rectangleHeight . "></td> \n";
    }
    $echoHTML .= "</tr> \n";
    $htmlData .= "</tr> \n";
}
$echoHTML .= "</table>";
$htmlData .= "</table></body></html>";
$newtextfile = $outfile . ".html";
$Handle = fopen('images/'. $newtextfile,'w');
fwrite($Handle, $htmlData);
fclose($Handle);
} else {
$echoHTML .= " picture wasn't uploaded / passed in to this page";
}
echo $echoHTML;
</body>
</html>
```

APPENDIX II

Html Listing for Image in FIG. 2(B)

```
<html><head><title>Show Encrypted Image</title><style>
.image1_class {background:transparent url('images/image1'); no-repeat;}
</style></head>
<body bgcolor='#ffffff'>
<table border=0 cellpadding=0 cellspacing=0 bgcolor='RED'>
<tr>
<td class='image1_class' style='background-position:—320px-120px;'><img src='nothing.gif' width=80 height=120></td>
<td class='image1_class' style='background-position:—560px-360px;'><img src='nothing.gif' width=80 height=120></td>
<td class='image1_class' style='background-position:—160px-240px;'><img src='nothing.gif' width=80 height=120></td>
<td class='image1_class' style='background-position:—240px 0px;'><img src='nothing.gif' width=80 height=120></td>
<td class='image1_class' style='background-position:—240px-360px;'><img src='nothing.gif' width=80 height=120></td>
<td class='image1_class' style='background-position:—160px 0px;'><img src='nothing.gif' width=80 height=120></td>
<td class='image1_class' style='background-position:—240px-240px;'><img src='nothing.gif' width=80 height=120></td>
<td class='image1_class' style='background-position:—400px-120px;'><img src='nothing.gif' width=80 height=120></td>
</tr>
<tr>
<td class='image1_class' style='background-position:—560px 0px;'><img src='nothing.gif' width=80 height=120></td>
<td class='image1_class' style='background-position:—480px-360px;'><img src='nothing.gif' width=80 height=120></td>
<td class='image1_class' style='background-position:—480px-120px;'><img src='nothing.gif' width=80 height=120></td>
<td class='image1_class' style='background-position:—160px-120px;'><img src='nothing.gif' width=80 height=120></td>
<td class='image1_class' style='background-position:—80px 0px;'><img src='nothing.gif' width=80 height=120></td>
<td class='image1_class' style='background-position:—240px-120px;'><img src='nothing.gif' width=80 height=120></td>
<td class='image1_class' style='background-position:—400px-360px;'><img src='nothing.gif' width=80 height=120></td>
<td class='image1_class' style='background-position:—320px-360px;'><img src='nothing.gif' width=80 height=120></td>
</tr>
<tr><td class='image1_class' style='background-position:—80px-120px;'><img src='nothing.gif' width=80 height=120></td><td class='image1_class' style='background-position:—80px-360px;'><img src='nothing.gif' width=80 height=120></td>
<td class='image1_class' style='background-position:0px 0px;'><img src='nothing.gif' width=80 height=120></td>
<td class='image1_class' style='background-position:—80px-240px;'><img src='nothing.gif' width=80 height=120></td>
<td class='image1_class' style='background-position:—480px-240px;'><img src='nothing.gif' width=80 height=120></td>
<td class='image1_class' style='background-position:—480px 0px;'><img src='nothing.gif' width=80 height=120></td>
<td class='image1_class' style='background-position:—560px-240px;'><img src='nothing.gif' width=80 height=120></td>
<td class='image1_class' style='background-position:—320px 0px;'><img src='nothing.gif' width=80 height=120></td>
</tr>
<tr>
<td class='image1_class' style='background-position:0px-120px;'><img src='nothing.gif' width=80 height=120></td>
<td class='image1_class' style='background-position:—560px-120px;'><img src='nothing.gif' width=80 height=120></td>
<td class='image1_class' style='background-position:—400px-240px;'><img src='nothing.gif' width=80 height=120></td>
```

```html
<td class='image1_class' style='background-position:—320px-240px;'><img src='nothing.gif' width=80 height=120></td>
<td class='image1_class' style='background-position:0px-240px;'><img src='nothing.gif' width=80 height=120></td>
<td class='image1_class' style='background-position:—160px-360px;'><img src='nothing.gif' width=80 height=120></td>
<td class='image1_class' style='background-position:0px-360px;'><img src='nothing.gif' width=80 height=120></td>
<td class='image1_class' style='background-position:—400px 0px;'><img src='nothing.gif' width=80 height=120></td>
</tr>
</table>
</body>
</html>
```

I claim:

1. A method comprising:
   - (A) obtaining an original digital image, said original digital image having a size consisting of a first number of pixels, said original digital image having a horizontal resolution and a vertical resolution;
   - (B) based at least in part on said size of said original image, determining a pixel block size, by:
     - (b1) creating a first array of factors of the horizontal resolution of the original image and a second array of factors of the vertical resolution of the original image;
     - (b2) forming a matrix of multiples of the factors in the first array and the factors in the second array, wherein each multiple of two factors in the matrix represents a corresponding number of chunks for those two factors;
     - (b3) selecting a combination of factors from the matrix which results in the fewest chunks while keeping the number of chunks less than a preset value, wherein the selected combination of factors correspond to a horizontal resolution of the pixel block and a vertical resolution of the pixel block;
   - (C) based on said pixel block size as determined in (B), dividing the original image into a plurality of pixel blocks;
   - (D) forming a scrambled image by rearranging the plurality of pixel blocks into a corresponding plurality of rearranged pixel blocks, wherein each pixel block has an original position in the original image and a rearranged position in the scrambled image;
   - (E) while forming the scrambled image in (D), maintaining a map of the rearranged positions of the plurality of rearranged pixel blocks relative to their corresponding original positions in the original image; and
   - (F) using said map to form a markup language description to enable display of the original image from the scrambled image,
   - wherein the horizontal resolution of the pixel block and the vertical resolution of the pixel block are selected, at least in part, to reduce the size of the markup language description.

2. The method of claim 1 wherein each pixel block represents a rectangular region of the original image.

3. The method of claim 2 wherein all of the pixel blocks have the same dimensions.

4. The method of claim 2 further comprising the step of: determining the number of pixel blocks.

5. The method of claim 1 wherein the markup language description is an HTML description.

6. The method of claim 1 wherein the resolution of the scrambled image differs from the resolution of the original image.

7. The method of claim 1 wherein the markup language description includes code to prevent screen captures of the original image.

8. The method of claim 7 wherein the code to prevent screen captures of the original image comprises code to repeatedly clear a user's clipboard.

9. The method of claim 2 wherein some of the pixel blocks have different dimensions.

10. The method of claim 5 wherein the combination of factors selected in (b3) consist of an x factor corresponding to the horizontal resolution of the pixel block size and a y factor corresponding to the vertical resolution of the pixel block size, the method further comprising:
    - (b4) if both the x factor and the y factor are evenly divisible by both numbers and if the y factor is greater than the y factor, then switching the x factor and the y factor.

11. A method comprising:
    - (A) obtaining a first digital image having a first image resolution;
    - (B) determining a second digital image based on said first digital image, said second digital image having a second image resolution, said second image resolution being a lower than said first image resolution, said second digital image having a size consisting of a number of pixels, said second digital image having a horizontal resolution and a vertical resolution;
    - (C) based at least in part on said size of said second digital image, determining a pixel block size by the steps of:
      - (c1) creating a first array of factors of the horizontal resolution of the second digital image and a second array of factors of the vertical resolution of the second digital image;
      - (c2) forming a matrix of multiples of the factors in the first array and the factors in the second array, wherein each multiple of two factors in the matrix represents a corresponding number of chunks for those two factors;
      - (c3) selecting a combination of factors from the matrix which results in the fewest chunks while keeping the number of chunks less than a preset value, wherein the selected combination of factors correspond to a horizontal resolution of the pixel block and a vertical resolution of the pixel block;
    - (D) based on said pixel block size as determined in (C), dividing the second digital image into a plurality of pixel blocks;
    - (E) forming a scrambled image by rearranging the plurality of pixel blocks into a corresponding plurality of rearranged pixel blocks, wherein each pixel block has an original position in the second digital image and a rearranged position in the scrambled image;
    - (F) while forming the scrambled image in (E), maintaining a map of the rearranged positions of the plurality of rearranged pixel blocks relative to their corresponding original positions in the second digital image; and
    - (G) using the map of the rearranged positions to form a markup language description to enable display of the second digital image from the scrambled image, wherein the markup language description includes code to prevent screen captures of the second digital image;
    - (H) using the scrambled image and the markup language description to display the second digital image; and (I) in response to payment from a user, providing the user with a copy of the first digital image.

12. The method of claim 11 wherein steps (A) through (H) are repeated for a plurality of photographic digital images in library of digital images.

13. The method of claim 11 wherein the markup language description is an HTML description.

14. A method comprising:
(A) obtaining a first digital image having a first image resolution, said first digital image being a digital image from a library of digital images;
(B) determining a second digital image based on said first digital image, said second digital image having a second image resolution, said second image resolution being a lower than said first image resolution, said second digital image having a size consisting of a number of pixels, said second digital image having a vertical image resolution and a horizontal image resolution;
(C) determining a pixel block size, said pixel block having a vertical block size and a horizontal block size, said pixel block size being based at least in part on (i) said size of said second digital image, (ii) said vertical image resolution, and (iii) said horizontal image resolution, wherein said pixel block size is determined by the steps of:
  (c1) creating a first array of factors of the horizontal image resolution of the second digital image and a second array of factors of the vertical image resolution of the second digital image;
  (c2) forming a matrix of multiples of the factors in the first array and the factors in the second array, wherein each multiple of two factors in the matrix represents a corresponding number of chunks for those two factors;
  (c3) selecting a combination of factors from the matrix which results in the fewest chunks while keeping the number of chunks less than a preset value, wherein the selected combination of factors correspond to a horizontal resolution of the pixel block and a vertical resolution of the pixel block;
(D) based on said pixel block size as determined in (C), dividing the second digital image into a plurality of pixel blocks;
(E) forming a scrambled image by rearranging the plurality of pixel blocks into a corresponding plurality of rearranged pixel blocks, wherein each pixel block has an original position in the second digital image and a rearranged position in the scrambled image;
(F) while forming the scrambled image in (E), maintaining a map of the rearranged positions of the plurality of rearranged pixel blocks relative to their corresponding original positions in the second digital image; and
(G) using the map of the rearranged positions to form a markup language description to enable display of the second digital image from the scrambled image, wherein the markup language description includes code to prevent screen captures of the second digital image;
(H) using the scrambled image and the markup language description to display the second digital image;
(I) in response to payment from a user, providing the user with a copy of the first digital image,
wherein said vertical block size and said horizontal block size are selected in (C) to reduce the size of the markup language description file.

15. The method of claim 14 wherein the markup language description is an HTML description.

16. The method of claim 11 wherein all of the pixel blocks have the same dimensions.

17. The method of claim 11 wherein some of the pixel blocks have different dimensions.

18. The method of claim 11 wherein the code to prevent screen captures of the second digital image comprises code to repeatedly clear a user's clipboard.

19. The method of claim 14 wherein some of the pixel blocks have different dimensions.

20. The method of claim 14 wherein all of the pixel blocks have the same dimensions.

* * * * *